(12) United States Patent
Handing et al.

(10) Patent No.: US 8,276,954 B2
(45) Date of Patent: Oct. 2, 2012

(54) BUMPER SYSTEM

(75) Inventors: Christian Handing, Langenberg (DE); Michael Wibbeke, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 12/719,087

(22) Filed: Mar. 8, 2010

(65) Prior Publication Data

US 2010/0237639 A1 Sep. 23, 2010

(30) Foreign Application Priority Data

Mar. 18, 2009 (DE) .......................... 10 2009 013 322

(51) Int. Cl.
*B60R 19/34* (2006.01)

(52) U.S. Cl. .......................... 293/133; 293/155

(58) Field of Classification Search .................. 293/102, 293/132, 133, 155; 296/203.01, 29, 30
See application file for complete search history.

(56) References Cited

U.S. PATENT DOCUMENTS

| | | | | |
|---|---|---|---|---|
| 4,336,868 A * | 6/1982 | Wilson et al. | ................... | 188/376 |
| 4,885,215 A * | 12/1989 | Yoshioka et al. | ................... | 428/632 |
| 4,969,980 A * | 11/1990 | Yoshioka et al. | ................... | 205/130 |
| 5,785,367 A * | 7/1998 | Baumann et al. | ................... | 293/133 |
| 6,698,809 B2 * | 3/2004 | Stol et al. | ................... | 293/133 |
| 7,188,876 B2 * | 3/2007 | Jaarda et al. | ................... | 293/133 |
| 7,246,832 B2 * | 7/2007 | Cobble et al. | ................... | 293/115 |
| 7,252,314 B2 * | 8/2007 | Tamura et al. | ................... | 293/133 |
| 7,503,603 B2 * | 3/2009 | Braunbeck et al. | ................... | 293/133 |
| 7,678,208 B2 * | 3/2010 | Bodin | ................... | 148/648 |
| 7,700,198 B2 * | 4/2010 | Takeda et al. | ................... | 428/653 |
| 7,718,914 B2 * | 5/2010 | Miklos | ................... | 219/74 |
| 7,800,011 B2 * | 9/2010 | Fukuda et al. | ................... | 219/74 |
| 7,823,939 B2 * | 11/2010 | Handing et al. | ................... | 293/133 |
| 8,002,167 B2 * | 8/2011 | Zuber et al. | ................... | 228/135 |
| 2005/0116012 A1 * | 6/2005 | Packer et al. | ................... | 228/112.1 |
| 2005/0139583 A1 * | 6/2005 | Fortain et al. | ................... | 219/137.71 |
| 2005/0258218 A1 * | 11/2005 | Schmaranzer et al. | ................... | 228/262.5 |
| 2007/0187380 A1 * | 8/2007 | Bruckner | ................... | 219/146.22 |
| 2007/0261769 A1 * | 11/2007 | Bodin | ................... | 148/559 |
| 2008/0001417 A1 * | 1/2008 | Asahi et al. | ................... | 293/155 |
| 2008/0246289 A1 * | 10/2008 | Skinner et al. | ................... | 293/115 |
| 2009/0001141 A1 * | 1/2009 | Spriestersbach et al. | ................... | 228/223 |
| 2009/0307907 A1 * | 12/2009 | Carl et al. | ................... | 29/890.046 |
| 2010/0237639 A1 * | 9/2010 | Handing et al. | ................... | 293/132 |
| 2011/0193371 A1 * | 8/2011 | Klimek | ................... | 296/187.09 |
| 2011/0233946 A1 * | 9/2011 | Pellmann et al. | ................... | 293/132 |

FOREIGN PATENT DOCUMENTS

EP 1234729 B1 4/2008

OTHER PUBLICATIONS

German Patent Office, Office Action dated Mar. 18, 2009 (3 pages).
Gunter Aichele, "Verschweißen von Aluminium mit Stahl," in Industriebedar, 2008, Heft 5-6, S. 14-16.
Rolf Langbein, "Kalt-Heißer Prozess bahnt neue Wege in der Schweißtechnik," in KEM, 2007, August-Heft, S. 20, 21.

* cited by examiner

*Primary Examiner* — Glenn Dayoan
*Assistant Examiner* — Gregory Blankenship
(74) *Attorney, Agent, or Firm* — Rader, Fishman & Grauer, PLLC

(57) ABSTRACT

A bumper system for motor vehicles has a cross-member and two crush boxes. The cross-member is made from steel and the crush boxes are made from aluminum, or vice versa. The bumper member that is made from steel has a zinc coating on at least the joint area thereof. A braze weld fixedly connects the crush boxes to the cross-member along associated joints.

13 Claims, 1 Drawing Sheet

BUMPER SYSTEM

CLAIM OF PRIORITY

Applicants hereby claim the priority benefits under the provisions of 35 U.S.C. §119, basing said claim of priority on German Patent Application Serial No. 102009013322.4, filed Mar. 18, 2009. In accordance with the provisions of 35 U.S.C. §119 and Rule 55(b), a certified copy of the above-listed German patent application will be filed before grant of a patent.

BACKGROUND OF THE INVENTION

The invention relates to bumpers for motor vehicles and the like, and in particular to a bumper system that includes a cross-member and crush boxes in accordance with the features of patent claim 1.

Bumper systems comprise individual components that have been designed to work together to absorb energy in a defined manner in the event of an accident. In addition, the bumpers must be designed for various types of collisions. In prior or classic car body constructions, the bumpers are produced from structural components made of welded steel and are therefore relatively heavy.

If alternative materials, such as aluminum, are used due to their lower specific weight, it is very important that the safety standards or classification for the motor vehicle be maintained, even if it has light-weight bumpers.

One possibility in reducing weight in bumper systems is a hybrid construction. Steel components are replaced with structural components made of aluminum. Unfortunately, the combination of aluminum and steel cannot be welded because the melting points for the individual materials are so different.

In the prior art there are for instance hybrid-construction bumpers comprising aluminum and steel. Steel cross members are bolted to aluminum crush boxes, or aluminum cross members are bolted to steel crush boxes. This type of mechanical fastener joining is complex, expensive, and the joining elements are relatively heavy. The bolted joining technique also has a negative impact on the overall component weight.

SUMMARY OF THE INVENTION

One object of the present invention is to provide a light-weight bumper system that can be used without additional joining elements, and to provide a method for producing such a bumper system.

The subject-matter portion of this object is attained according to the invention using the features identified in patent claim 1.

Additional advantageous embodiments of the inventive concept are the subject-matter of the dependent claims.

The method portion of this object is attained using the steps or measures identified in patent claim 7.

The present bumper system includes a cross-member and crush boxes. Either the cross-member comprises steel and the crush boxes comprise aluminum or the cross-member comprises aluminum and the crush boxes comprise steel. In the joint area, braze welding is used to join the cross-member to the crush boxes, and the steel component has a zinc coating, at least in the joint area.

Preferably a higher strength steel is used for the cross-member. In the final configuration, its tensile strength Rm is in the range of 800 MPa to 1,800 MPa. Aluminum materials whose tensile strength are preferably in a range of 85 MPa to 350 MPa are preferably used for the crush boxes.

The weight of hybrid-construction bumpers that are made of aluminum and steel is lower than that of a bumper that has the same geometry and that comprises only steel. The combination of cross-members made of steel and crush boxes made of aluminum in particular provides very good deformation behavior, both at slow crash speeds and at higher speeds, because aluminum has a very low sensitivity to strain rate.

Braze welding is a thermal joining method for joining the aluminum and steel structural components of the bumper. In this method, an arc is produced using metal inert gas welding. An aluminum wire is used for a filler, and may also contain zinc. It is possible to use very thin steel structural components because braze welding adds only a relatively small amount of heat to the components. The thickness of the steel component is preferably in the range of 1 mm to 3 mm, and the thickness of the aluminum component is preferably in the range of 1 mm to 4 mm. In addition, with braze welding it is possible to join the cross-member and crush boxes at multiple, discrete points. But, it is also possible to produce a continuous weld seam that runs around the circumference of the crush boxes, and provides a uniform joint between the crush boxes and the cross-member.

Once the cross-member and crush boxes have been joined, the strengths attained with the braze welding are in the range of the strength of the aluminum, or in the range of the strength of the zinc coating for the steel component.

The zinc coating that is required in the joint area may be provided by galvanizing the coils prior to cold-forming or hot-forming a structural component, using a thermal diffusion layer made of zinc after hot-forming the structural component, or using a powder coating. The zinc coating preferably has a thicknesses in the range of 5 µm to 50 µm.

The braze weld results in a perfect material bond between the crush boxes and the cross-members in the joint area, such that mechanical joint parts or separate mechanical fasteners are not necessary. The present bumper combines the advantages of a light-weight hybrid construction, with the advantages of a welded joint. In addition, the present bumper is corrosion-resistant by virtue of the aluminum components and the galvanized steel components.

Mounting plates are provided for attaching the bumper to the vehicle and can comprise the appropriate materials selected in accordance with the material from which the crush boxes are made. Thus, mounting plates made of aluminum can be used with aluminum crush boxes, while mounting plates made of steel can be attached to the crush boxes when the latter are made of steel. The aluminum components are joined using metal inert gas (MIG) welding, and the steel components are joined using metal active gas (MAG) welding.

In one exemplary embodiment of the present invention, the mounting plates comprise steel, especially when increased loads due to towing are expected. In this case, the cross-member and mounting plates are preferably made of steel, and the crush boxes are preferably made of aluminum. The steel mounting plates are joined to the crush boxes using braze welding in the same manner as the steel cross-members. It is advantageous that the same or identical welding system can be used for joining the various components.

A zinc coating is applied in the present bumper production method, at least in the joint area of the steel component. The steel crush boxes and the steel cross-members are preferably embodied as a fully galvanized steel component. The zinc coating can be applied either prior to the steel component being hot-formed, or it can be applied using a thermal diffusion method, or by powder coating after the steel component has been hot-formed.

In order to join the parts of the bumper, the crush boxes and cross-member are brought into contact with one another in the joint area. Braze welding is used to thermally join the steel component and the aluminum component. Metal inert gas welding is used. An aluminum wire that may contain zinc is used for a filler. During the braze welding process, the aluminum sheet is fused at the connecting edge, the liquid aluminum from the wire wets the zinc-coated steel material, and acts as the solder for the steel material. The galvanized steel component does not melt at the connecting edge because the temperatures are relatively low, and the zinc improves the wetting of the galvanized structural component surface with the molten material from the aluminum wire. The braze welding produces a braze weld seam in the joint area. This weld seam may be produced in the joint area as a continuous weld bead or seam that runs completely around the circumference of the crush box. Alternatively, it is also possible to use braze welding to join only certain discrete segments or portions of the joint area between the cross-member and crush box.

Three different working embodiments of the present invention bumper system are described below.

The first preferred variant of the present invention comprises a hot-formed cross-member made of a material with the commercial designation BTR (22MnB5) that has a tensile strength of 1,300 MPa to 1,800 MPa. The associated crush boxes comprise aluminum from the 5,000, 6,000, or 7,000 series in accordance with DIN EN 573-3/DIN EN 573-4. That is, these are alloys that are at least 99% aluminum, the main alloy element in the 5,000 series being magnesium. The main alloy elements for the 6,000 series are magnesium and silicon. Suitable aluminum alloys have the specific designation 5083 or 6060. These are alloys that have a tensile strength Rm of 80 MPa to 250 MPa. The mounting plates in this exemplary embodiment are made from a high-strength steel with a tensile strength of 500 MPa to 1,200 MPa.

In a second variant of the present invention, the cross-member is cold-formed steel, such as roll formed. Suitable steel materials are martensitic multiphase steels, dual phase steels, so-called complex phase steels, and other steels having tensile strengths ranging from 800 MPa to 1,400 MPa. The associated crush boxes are made from the same alloys as the preceding first exemplary embodiment. The mounting plates likewise are made from a high-strength steel, as in the first exemplary embodiment.

In a third variant of the present invention, the cross-member is made from aluminum materials in the 6,000 and 7,000 series. Specific suitable aluminum materials have the designation 6082 or 7003. Aluminum materials in the 7,000 series have zinc as the main alloy element, and their tensile strengths are in the range of 200 MPa to 450 MPa. A steel material having a tensile strength of 300 MPa to 700 MPa is used for the crush box. One example is a steel with the designation S500. Again, the mounting plates can be made from the same aluminum material as the cross-member.

The present bumper has a material-bond joint between the cross-member and the crush boxes that is produced solely by braze welding, and therefore does not require any additional or separate mechanical fasteners or joining elements. Using steel components in combination with aluminum components enables the fabrication of a light-weight bumper system that also has good crashworthiness and energy absorption.

These and other advantages of the invention will be further understood and appreciated by those skilled in the art by reference to the following written specification, claims, and appended drawings.

The invention shall be described in greater detail using an exemplary embodiment depicted in the drawings.

DETAILED DESCRIPTION OF THE PREFERRED EMBODIMENTS

Figure 1:
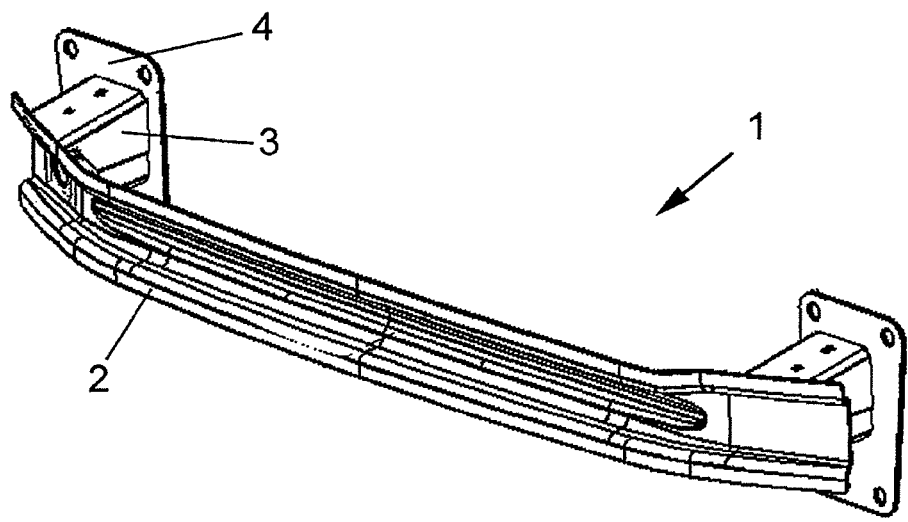
FIG. 1 is a perspective front elevation of a bumper system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 depicts an exemplary embodiment of a bumper 1 that comprises a cross-member 2 made of steel, for instance hot-formed, high-strength steel, with a zinc coating applied thereto after hot-forming using thermal diffusion. The crush boxes 3 are made from aluminum. The two crush boxes 3 are joined to the cross-member 2 using braze welding. The crush boxes 3 are attached to aluminum mounting plates 4, using MIG welding. The completed bumper assembly 1 is then attached to the vehicle.

Figure 2:
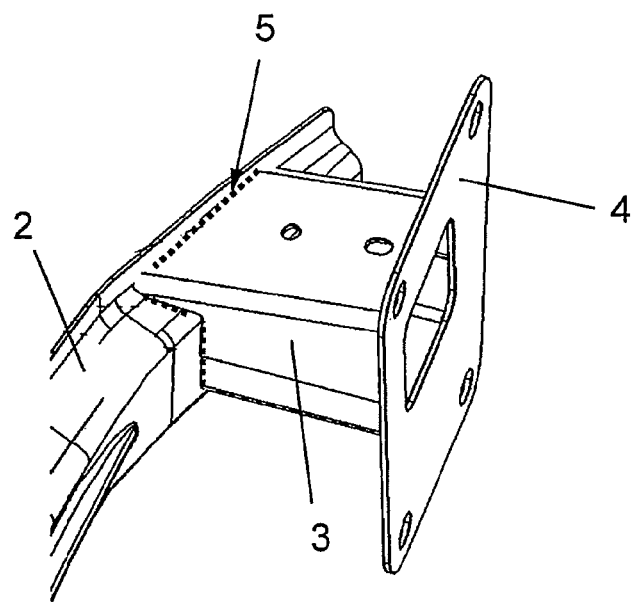
FIG. 2 is a fragmentary view of the bumper system, particularly showing the joint area between the crush boxes and the cross-member.

FIG. 2 depicts the cross-member 2 made of steel, the crush boxes 3 made of aluminum, and the joint area between these two structural parts. Braze welding in the joint area produces a braze weld seam 5. The latter may be formed across part of the circumference of the crush boxes 3, for instance in the longitudinal direction of the cross-member 2, or perpendicular to the cross-member 2, or the braze weld seam may run continuously around the entire circumference of the joint area.

Reference List
   1—Bumper
   2—Cross-member
   3—Crush boxes
   4—Mounting plates
   5—Braze weld seam In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:
1. A bumper system for motor vehicles, comprising:
a cross-member having a joint area, and being constructed from one of a steel material and an aluminum material;

at least one crush box having inner and outer ends and a peripheral edge extending around the entire inner end and defining a joint area, and being constructed from the other one of said steel material and said aluminum material; and wherein said one of said cross-member and said crush box that is constructed from said steel material has a zinc coating on at least said joint area thereof; and including a braze weld extending around substantially the entire peripheral edge and fixedly connecting said joint area of said cross-member with said joint area of said crush box.

2. The bumper system as set forth in claim 1, wherein:
said zinc coating has a thickness in the range of 5 μm to 50 μm.

3. The bumper system as set forth in claim 1, wherein:
said one of said cross-member and said crush box that is constructed from said steel material has a thickness in the range of 1 mm to 3 mm; and
said one of said cross-member and said crush box that is constructed from said aluminum material has a thickness in the range of 1 mm to 4 mm.

4. The bumper system as set forth in claim 1, wherein:
said cross-member is constructed from said steel material having a tensile strength Rm in the range of 800 MPa to 1,800 MPa; and
said crush box is constructed from said aluminum material having a tensile strength in the range of 85 MPa to 350 MPa.

5. The bumper system as set forth in claim 1, wherein:
said zinc coating comprises either a thermal diffusion layer or a powder coating.

6. The bumper system as set forth in claim 1, including:
mounting plates constructed from said other one of said steel material and said aluminum material connected with an end of said crush box facing away from said cross-member by a material bond.

7. A bumper system for motor vehicles, comprising:
a cross-member having an elongated rear surface, the rear surface defining a joint area that faces generally rearwardly, and wherein the cross-member is constructed from one of a steel material and an aluminum material;
at least one crush box having an outer edge and an outer surface immediately adjacent the outer edge facing transversely relative to the rear surface of the cross-member, the outer surface defining a joint area, and wherein said crush box is constructed from the other one of said steel material and said aluminum material; and wherein said one of said cross-member and said crush box that is constructed from said steel material has a zinc coating on at least said joint area thereof; and including a braze weld fixedly connecting said joint area of said cross-member with said transversely facing joint area of said outer surface of said crush box.

8. The bumper system as set forth in claim 7 wherein:
said outer edge of the crush box forms a portion of the joint area and includes a vertically-extending portion, and a portion extending transverse relative to said vertically-extending portion.

9. The bumper system as set forth in claim 8 wherein:
said vertically-extending portion is substantially linear.

10. The bumper system as set forth as claim 7, wherein:
the outer surface is substantially planar.

11. A bumper system for motor vehicles, comprising:
a cross-member having a non-planar joint area, and being constructed from one of a steel material and an aluminum material;
at least one crush box having an edge defining a non-planar joint area having a shape that closely corresponds to said non-planar joint area of the cross-member, and being constructed from the other one of said steel material and said aluminum material; and wherein
said one of said cross-member and said crush box that is constructed from said steel material has a zinc coating on at least said joint area thereof; and including
a braze weld fixedly connecting said non-planar joint area of said cross-member with said non-planar joint area of said crush box.

12. The bumper system as set forth in claim 11, wherein:
said crush box defines a peripheral outer surface, and said braze weld extends around substantially the entire peripheral outer surface.

13. The bumper system as set forth in claim 11, wherein:
said cross-member has a generally curved shape in plan view and an upright elongated generally convex rear surface having end portions that extend outwardly and rearwardly adjacent said joint areas.

* * * * *